US006996496B2

(12) United States Patent
Abe et al.

(10) Patent No.: US 6,996,496 B2
(45) Date of Patent: *Feb. 7, 2006

(54) INFORMATION PROCESSING SYSTEM AND INFORMATION PROCESSING METHOD

(75) Inventors: Yuichi Abe, Tokyo (JP); Ryoichi Imaizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/090,415

(22) Filed: Mar. 25, 2005

(65) Prior Publication Data

US 2005/0171726 A1 Aug. 4, 2005

Related U.S. Application Data

(63) Continuation of application No. 10/668,829, filed on Sep. 23, 2003, now Pat. No. 6,922,653.

(30) Foreign Application Priority Data

Oct. 3, 2002 (JP) .............................. 2002-290716

(51) Int. Cl.
*G06F 19/00* (2006.01)

(52) U.S. Cl. ...................................................... 702/153
(58) Field of Classification Search ................ 702/153, 702/150, 21; 313/312; 345/156, 8; 315/317, 315/294; 340/825, 10, 995; 33/702; 250/492
See application file for complete search history.

(56) References Cited

U.S. PATENT DOCUMENTS 6,710,719 B1 * 3/2004 Jones et al. ............. 340/825.49
6,922,653 B2 * 7/2005 Abe et al. .................... 702/153

\* cited by examiner

*Primary Examiner*—Bryan Bui
*Assistant Examiner*—Tung S. Lau
(74) *Attorney, Agent, or Firm*—Bell, Boyd & Lloyd LLC

(57) ABSTRACT

A magnetic 3D-position/orientation measuring device measures the position of a receiver in a measurement space. A control device computes correspondence between a measurement space and a real space based on the measured value and a real-space value, which corresponds to the measured value and which indicates the position of the receiver in a real space. Also, the control device corrects an error of the measured value measured by the magnetic 3D-position/orientation measuring device based on the correspondence between the measurement space and the real space, the error resulting from the ambient environment.

2 Claims, 12 Drawing Sheets

INFORMATION PROCESSING SYSTEM AND INFORMATION PROCESSING METHOD

CROSS REFERENCE TO RELATED APPLICATIONS

The present application is a continuation of U.S. patent application Ser. No. 10/668,829 filed on Sep. 23, 2003, now U.S. Pat. No. 6,922,653 the disclosure of which is herein incorporated by reference.

The present invention relates to an information processing system, an information processing method, an information processor, an information processing method, and a program. In particular, the present invention relates to an information processing system, an information processing method, an information processor, an information processing method, and a program, in which 3D-position/orientation of an object can be measured by a user-friendly operating system, so that an error of the measured value resulting from an ambient environment can be adequately corrected.

BACKGROUND OF THE INVENTION

In recent years, an information processing technology and information and communication technologies have been developing significantly. Accordingly, information processors including personal computers and portable information terminals are unevenly distributed throughout the real world, such as offices and homes. Under these circumstances, it is expected that a system for actively utilizing the situation of the real world (for example, positions of objects and users in the real world) will be realized.

Accordingly, the use of a system for measuring 3D-position/orientation of an object in the real world has been considered (hereinafter the system is referred to as a 3D-position/orientation measuring system). Specifically, the use of a 3D-position/orientation measuring system using a method applying a magnetic conversion phenomenon (when a coil is placed in a magnetic field, a current is induced to the coil (hereinafter, a method using magnetic conversion is referred to as a magnetic method)), has been considered (see U.S. Pat. No. 3,868,565 "Object tracing and orientation determination means, system and process).

In a 3D-position/orientation measuring system using a magnetic method, a user can freely move an object, and thus a user's operation can be simplified. However, the 3D-position/orientation measuring system using a magnetic method has a problem of being subject to the ambient environment which disturbs a magnetic field, such as electronic equipment, metallic components, and geomagnetism. That is, a measured value of an object measured by a magnetic 3D-position/orientation measuring system includes an error, which results from the ambient environment. Therefore, the magnetic 3D-position/orientation measuring system is not suitable for the situation where the ambient environment cannot be specified.

In order to overcome this problem, it has been considered to use an optical, ultrasonic, or mechanical 3D-position/orientation measuring system, in which the 3D-position/orientation of an object can be measured without being affected by the ambient environment, such as a magnetic field. However, in the 3D-position/orientation measuring system using an optical, ultrasonic, or mechanical method, a measurement range is limited or a user's operation become complicated, compared with the magnetic method.

That is, in an optical 3D-position/orientation measuring system, image of three or more markers is taken by a camera, and 3D-position/orientation is measured based on image information of the markers. On the other hand, an ultrasonic 3D-position/orientation measuring system includes a transmitter and a receiver, in which 3D-position/orientation is measured based on the pressure and transport speed of an ultrasonic wave, which is transmitted from the transmitter and is received by the receiver.

Therefore, in an optical or ultrasonic 3D-position/orientation measuring system, when visual information (image information of markers) is hidden behind a hand or other objects or when an ultrasonic wave cannot be detected, the 3D-position/orientation of an object cannot be measured (because of limited measurement range). Thus, a user has to operate a device while always being conscious of visual information and occlusion of ultrasonic waves.

Also, a mechanical 3D-position/orientation measuring system includes a mechanical movable portion, such as a polyarticular arm, in which 3D-position/orientation is measured based on the movement of the movable portion. Accordingly, the mechanical 3D-position/orientation measuring system has problems in that a measurement range is narrow (the range is limited within the movable range of the movable portion), and that the cost increases in order to ensure some accuracy. In order to overcome the problems in such a mechanical method, a plurality of inexpensive mechanical 3D-position/orientation systems may be used at the same time. In this case, however, new problems occur, that is, measurement accuracy is degraded and user's operation becomes complicated, compared with the case where another method is used.

As described above, a magnetic 3D-position/orientation measuring system has advantages in that a user's operation can be simplified and a measurement range is wide. On the other hand, other types of systems (for example, optical, ultrasonic, and mechanical systems) have advantages in that a reliable measured value which is not affected by the ambient environment can be obtained. A system having the combination of these advantages has not been devised.

SUMMARY OF THE INVENTION

The present invention has been made in view of these circumstances, and it is an object of the present invention to measure 3D-position/orientation of an object by using a user-friendly operation system so as to adequately correct an error of the measured value resulting from the ambient environment.

An information processing system of the present invention includes a first information processor and a second information processor. The first information processor measures a spatial position of an object so as to output a measured value. The second information processor processes the measured value, which has been output from the first information processor and which indicates the position of the object in a measurement space, and processes a real-space value, which corresponds to the measured value and which indicates the position of the object in a real space. Also, the second information processor computes correspondence between the measurement space and the real space based on the measured value and the real-space value, and corrects an error of the measured value based on the computed correspondence between the measurement space and the real space, the error resulting from the ambient environment of the first information processor.

An information processing method of the present invention is performed by an information processing system including a first information processor and a second information processor. The first information processor measures a spatial position of an object so as to output a measured value. The second information processor processes the measured value, which has been output from the first information processor and which indicates the position of the object in a measurement space, and processes a real-space value, which corresponds to the measured value and which indicates the position of the object in a real space. Also, the second information processor computes correspondence between the measurement space and the real space based on the measured value and the real-space value, and corrects an error of the measured value based on the computed correspondence between the measurement space and the real space, the error resulting from the ambient environment of the first information processor.

In the system and method of processing information of the present invention, the first information processor measures a spatial position of an object so as to output a measured value. Then, the second information processor processes the measured value, which has been output from the first information processor and which indicates the position of the object in a measurement space, and processes a real-space value, which corresponds to the measured value and which indicates the position of the object in a real space. Also, the second information processor computes correspondence between the measurement space and the real space based on the measured value and the real-space value, and corrects an error of the measured value based on the computed correspondence between the measurement space and the real space, the error resulting from the ambient environment of the first information processor. Each of the first and second information processors of the present invention may be an independent device or may be part of a predetermined information processor.

An information processor of the present invention includes a measured-value input unit for inputting a measured value indicating the position of an object in a measurement space when a first 3D-position measuring device measures the spatial position of the object and outputs the measured value; a real-space-value input unit for inputting a real-space value which corresponds to the measured value input by the measured-value input unit and which indicates the position of the object in a real space; a correspondence computing unit for computing correspondence between the measurement space and the real space based on the measured value input by the measured-value input unit and the real-space value input by the real-space-value input unit; and a correcting unit for correcting an error of the measured value input by the measured-value input unit based on the correspondence between the measurement space and the real space computed by the correspondence computing unit, the error resulting from the ambient environment of the first 3D-position measuring device. The first 3D-position measuring device may be a magnetic 3D-position measuring device.

When a second 3D-position measuring device, which can measure the position of the object without being affected by the ambient environment, measures the position of the object existing at the same position as that measured by the first 3D-position measuring device so as to output the measured value, the real-space-value input unit inputs the measured value output from the second 3D-position measuring device as the real-space value.

The second 3D-position measuring device may be an optical 3D-position measuring device. Also, the second 3D-position measuring device may be an ultrasonic 3D-position measuring device. Further, the second 3D-position measuring device may be a mechanical 3D-position measuring device.

The correspondence computing unit estimates a measured value which has not been input by the measured-value input unit and a real-space value which has not been input by the real-space-value input unit based on at least one measured value input by the measured-value input unit and at least one real-space value input by the real-space-value input unit, and computes the correspondence between the measurement space including the input measured value and the estimated measured value and the real space including the input real-space value and the estimated real-space value.

The correspondence computing unit selects part of a plurality of measured values input by the measured-value input unit and part of a plurality of real-space values input by the real-space-value input unit in accordance with a predetermined selecting method, and computes the correspondence between the measurement space and the real space based on the selected measured value and real-space value.

In the above-described selecting method, part of the plurality of measured values input by the measured-value input unit and part of the plurality of real-space values input by the real-space-value input unit are selected based on spatial-position relationship between each of the plurality of real-space values and another real-space value.

Alternatively, in the above-described selecting method, part of the plurality of measured values input by the measured-value input unit and part of the plurality of real-space values input by the real-space-value input unit are selected based on the input time of each of the measured values to the measured-value input unit and on the input time of each of the real-space values to the real-space-value input unit.

The correspondence computing unit sequentially updates the correspondence between the measurement space and the real space every time a predetermined condition is satisfied, and the correcting unit corrects the measured value input by the measured-value input unit based on the latest correspondence between the measurement space and the real space. The condition for updating the correspondence between the measurement space and the real space is a lapse of predetermined time from the time when the correspondence between the measurement space and the real space was last updated.

Alternatively, the condition for updating the correspondence between the measurement space and the real space is set based on spatial-position relationship between the real-space value input by the real-space-value input unit and each of the plurality of real-space values which have already been input.

The information processor may further include an output control unit for performing control so as to output information for notifying the user whether or not the measured value and the real-space value, which are required for computing the correspondence between the measurement space and the real space by the correspondence computing unit, have been input by the measured-value input unit and the real-space-value input unit.

An information processing method of the present invention is performed by an information processor, which corrects a measured value indicating a spatial position of an object, the measured value being measured by and output from a 3D-position measuring device. The method includes a measured-value input step of inputting the measured value which has been output from the 3D-position measuring device and which indicates the position of the object in a measurement space; a real-space-value input step of inputting a real-space value which corresponds to the measured value input in the measured-value input step and which indicates the position of the object in a real space; a correspondence computing step of computing correspondence between the measurement space and the real space based on the measured value input in the measured-value input step and the real-space value input in the real-space-value input step; and a correcting step of correcting an error of the measured value input in the measured-value input step based on the correspondence between the measurement space and the real space computed in the correspondence computing step, the error resulting from the ambient environment of the 3D-position measuring device.

A program of the present invention allows a computer to execute correction of a measured value which has been measured by a 3D-position measuring device and which indicates a spatial position of an object. The program includes a correspondence computing step of computing correspondence between a measurement space and a real space based on the measured value which has been measured by the 3D-position measuring device and which indicates the position of the object in the measurement space and on a real-space value which corresponds to the measured value and which indicates the position of the object in the real space; and a correcting step of correcting an error of the measured value measured by the 3D-position measuring device based on the correspondence between the measurement space and the real space computed in the correspondence computing step, the error resulting from the ambient environment of the 3D-position measuring device.

In the information processor, information processing method, and program of the present invention, the correspondence between the measurement space and the real space is computed based on the measured value which has been measured by the 3D-position measuring device and which indicates the position of the object in the measurement space, and on the real-space value which corresponds to the measured value and which indicates the position of the object in the real space. Then, an error of the measured value measured by the 3D-position measuring device is corrected based on the computed correspondence between the measurement space and the real space, the error resulting from the ambient environment of the 3D-position measuring device.

The information processor of the present invention may be independent from each of the first and second 3D-position measuring devices. Alternatively, the information processor may be included in a device having at least one of the first and second 3D-position measuring devices.

Additional features and advantages of the present invention are described in, and will be apparent from, the following Detailed Description of the Invention and the figures.

DETAILED DESCRIPTION OF THE INVENTION

Figure 1:
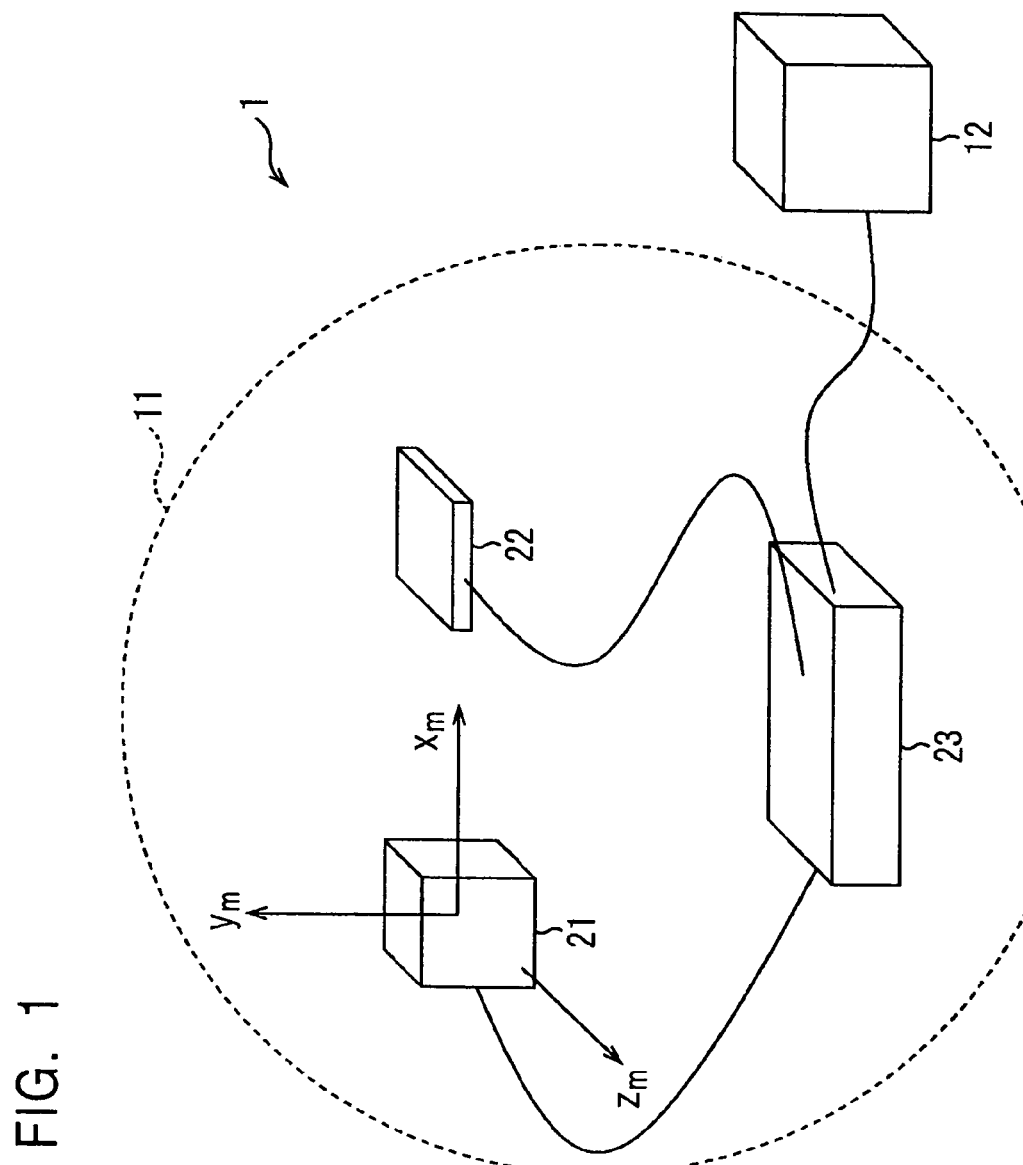
FIG. 1 shows an example of the configuration of a 3D-position/orientation measuring and correcting system, serving as an information processing system according to the present invention.

FIG. 1 shows an example of the configuration of a 3D-position/orientation measuring and correcting system 1 to which the present invention is applied. As shown in FIG. 1, the 3D-position/orientation measuring and correcting system 1 includes a magnetic 3D-position/orientation measuring device 11 (hereinafter referred to as a magnetic measuring device 11) and a control device 12. The magnetic measuring device 11 includes a magnetic-field generator 21, a receiver 22, and a magnetic controller 23.

In the magnetic measuring device 11, current is induced to a coil of the receiver 22 due to a magnetic field generated by the magnetic-field generator 21 and the induced current is processed by the magnetic controller 23. Accordingly, coordinates (position) and angle (orientation) of the receiver 22 in the coordinate system (Xm, Ym, and Zm) of the magnetic-field generator 21 are measured.

However, when distortion occurs in the magnetic field generated by the magnetic-field generator 21 due to electronic apparatuses and metallic components (not shown) around the magnetic measuring device 11, an error occurs between the actual position/orientation of the receiver 22 and a value measured by the magnetic measuring device 11.

Accordingly, in the embodiment, the control device 12 corrects (cancels) the error of a measured value output from the magnetic measuring device 11, the error resulting from the above-mentioned ambient environment, so that the actual position/orientation of the receiver 22 can be adequately computed.

That is, the control device 12 processes a measured value which has been output from the magnetic measuring device 11 and which indicates the position of the receiver 22 in a measurement space, and also processes a real-space value which corresponds to the measured value and which indicates the position of the receiver 22 in a real space. Then, the control device 12 computes correspondence between the measurement space and the real space (mapping from the measurement space to the real space) based on the measured value and the real-space value, and corrects the error of the measured value caused by the environment of the magnetic measuring device 11 based on the computed correspondence between the measurement space and the real space. These processes performed by the control device 12 will be described later with reference to flowcharts shown in FIGS. 6, 8, 11, and 12.

Figure 2:
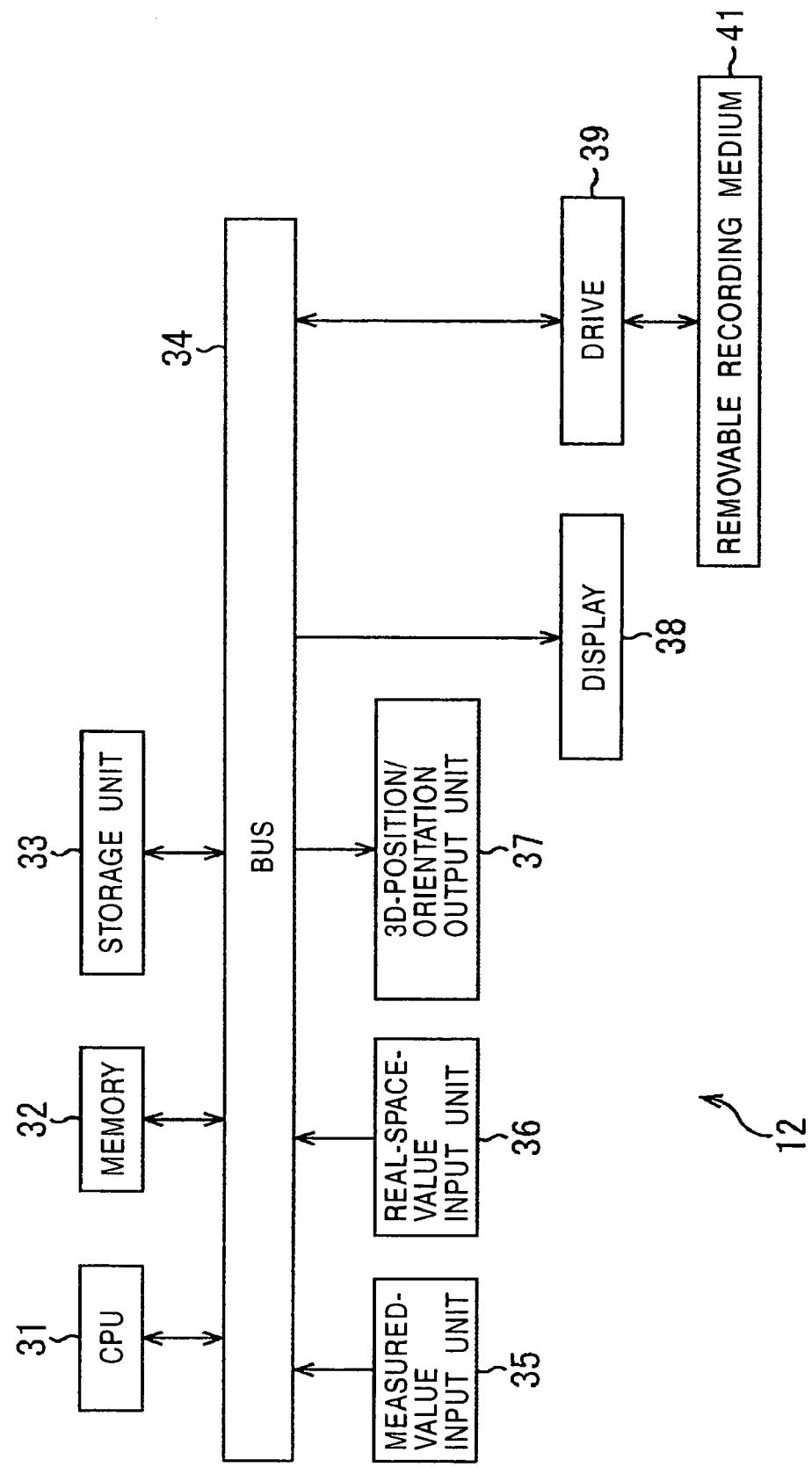
FIG. 2 is a block diagram showing an example of the hardware structure of a control device included in the 3D-position/orientation measuring and correcting system shown in FIG. 1, the control device serving as an information processor according to the present invention.

FIG. 2 shows an example of the configuration of the control device 12. In FIG. 2, a central processing unit (CPU) 31 executes various processes in accordance with a program stored in a memory 32 in advance or a program loaded from a storage unit 33 to the memory 32. The memory 32 also stores data which is required for the CPU 31 to execute various processes.

Specifically, in this example, programs such as application software for correcting the error of a measured value output from the magnetic measuring device 11 (FIG. 1) and computer graphics application software for moving a virtual object in a virtual space (virtual object corresponding to an object in the real world) based on the input 3D-position/orientation of an object in the real world are adequately loaded into the memory 32. Then, the CPU 31 executes the programs loaded into the memory 32.

In this example, the storage unit 33 includes a hard disk drive (HDD) or a randomly accessible recording medium such as an optical disk. Alternatively, the storage unit 33 may include a recording medium which cannot be randomly accessed, such as a tape-streamer, or a nonvolatile semiconductor memory, such as a memory stick (registered trademark). Alternatively, the storage unit 33 may include an external storage device of another system (not shown) connected through a network. Further, the storage unit 33 may include a combination of a plurality of recording media and storage devices.

The CPU 31, the memory 32, and the storage unit 33 are mutually connected through a bus 34. A measured-value input unit 35, a real-space-value input unit 36, and a 3D-position/orientation output unit 37 are also connected to the bus 34.

The measured-value input unit 35 is connected to the magnetic controller 23 of the magnetic measuring device 11 (FIG. 1). With this configuration, the measured-value input unit 35 inputs a measured value which has been output from the magnetic controller 23 and which indicates the position/orientation of the receiver 22 (FIG. 1) in a measurement space (measured position and orientation), so that the measured value is supplied to the CPU 31.

The real-space-value input unit 36 inputs a real-space value which corresponds to the measured value input by the measured-value input unit 35 and which indicates the position/orientation of the receiver 22 in the real space (actual position and orientation), so that the real-space value is supplied to the CPU 31.

The above-mentioned correspondence between a measurement space and a real space (details will be described later) is computed by using the measured value (measured coordinates) of the receiver 22 and the real-space value (actual coordinates) of the receiver 22. Therefore, the measured-value input unit 35 inputs the measured value of the receiver 22 and the real-space-value input unit 36 inputs the real-space value of the receiver 22.

Figure 3:
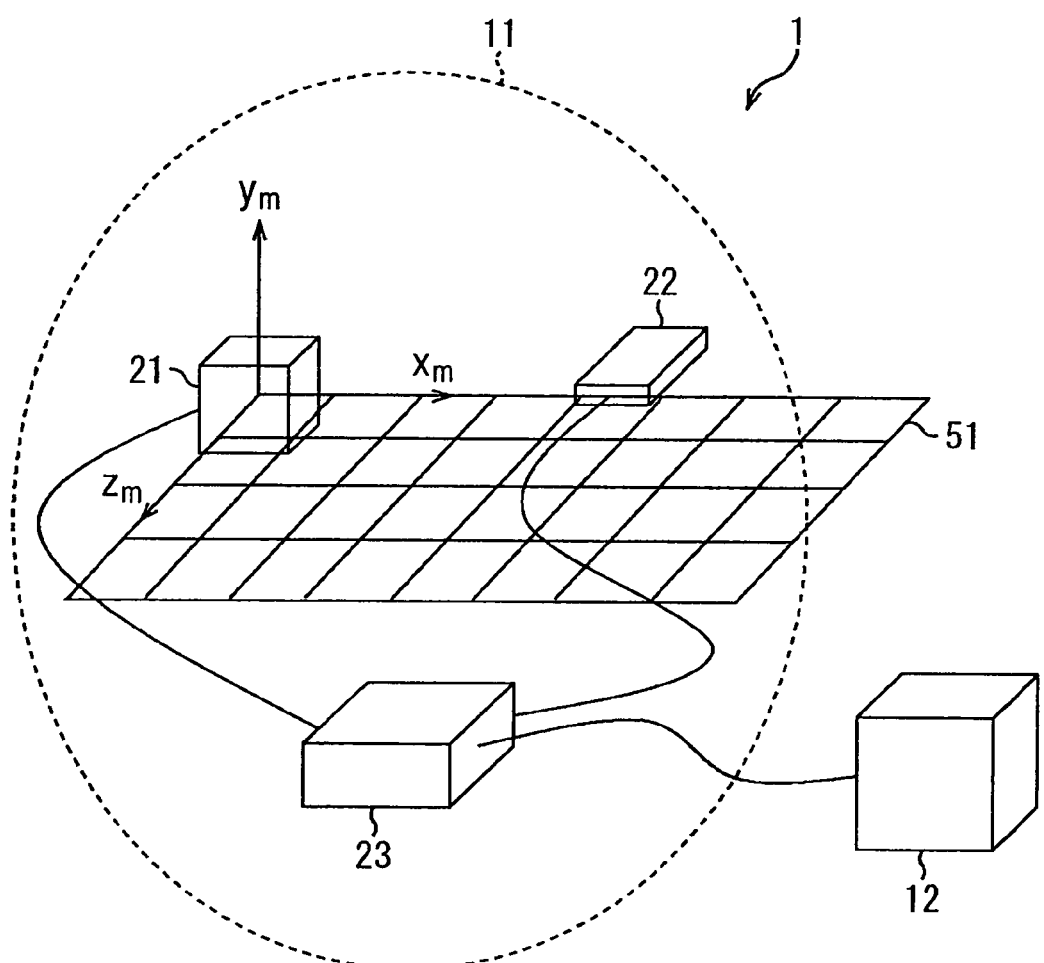
FIG. 3 illustrates an example of a method for obtaining a real-space value in the 3D-position/orientation measuring and correcting system shown in FIG. 1.

The real-space value of the receiver 22 can be accurately measured by using a measure or the like. Specifically, as shown in FIG. 3, a user places a lattice 51 of uniform cells in the real space and also places the receiver 22 on a predetermined intersection of the lattice 51. Then, the measured-value input unit 35 (FIG. 2) inputs the measured value of the receiver 22 (coordinates at the measured intersection) output from the magnetic controller 23 of the magnetic measuring device 11, whereas the real-space-value input unit 36 (FIG. 2) inputs the actual coordinates of the intersection. In this case, the real-space-value input unit 36 includes input devices such as a mouse and a keyboard, and the user operates the input devices (real-space-value input unit 36) so as to manually input the actual coordinates of the intersection.

However, when the user has to manually input a real-space value, user's operation will be complicated as the number of real-space values to be input increases. Therefore, in this example, a 3D-position/orientation measuring device (a device different from the magnetic measuring device 11), which can measure the position of the receiver 22 without being affected by the ambient environment, measures the position/orientation of the receiver 22 existing at the same position as that measured by the magnetic measuring device 11. Accordingly, the control device 12 uses the measured value as the real-space value of the receiver 22.

Figure 4:
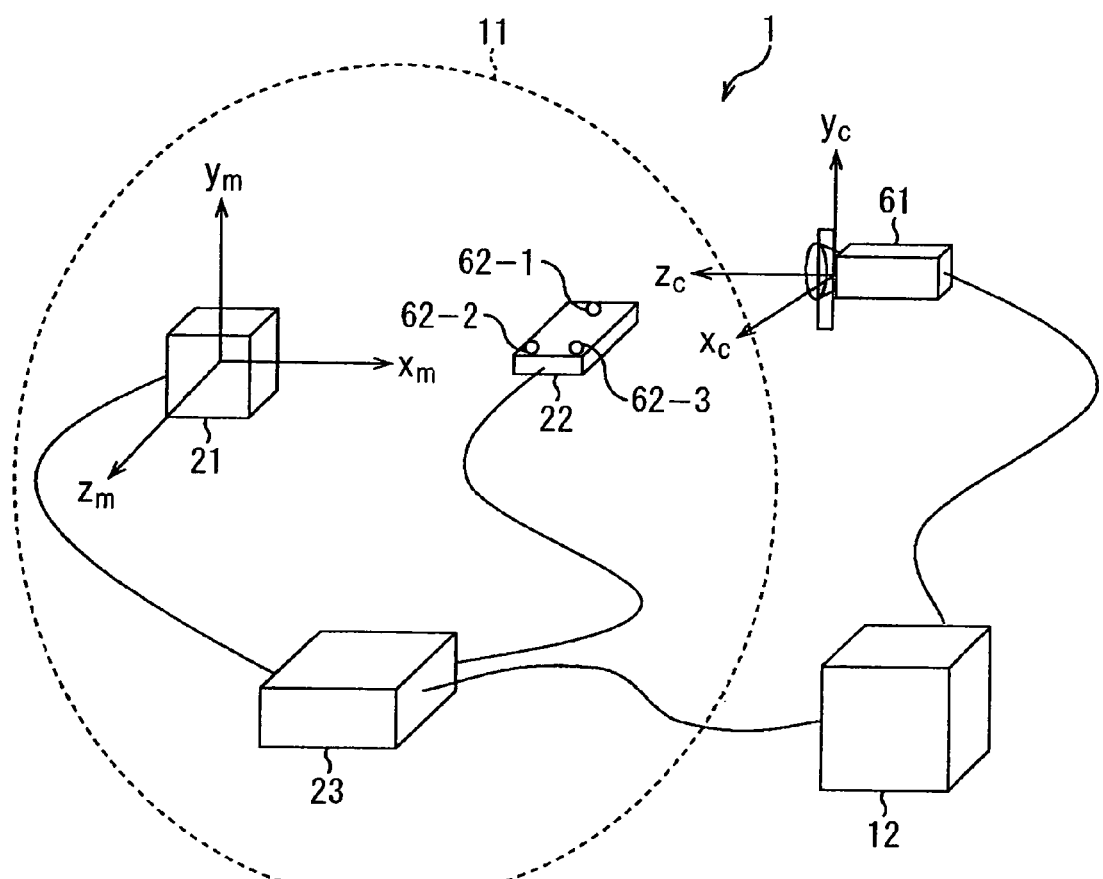
FIG. 4 illustrates another example of the method for obtaining a real-space value in the 3D-position/orientation measuring and correcting system shown in FIG. 1.

Specifically, in this example, the position/orientation of the receiver 22 is measured by an optical 3D-position/orientation measuring device shown in FIG. 4, and the measured value is used as the real-space value of the receiver 22.

As shown in FIG. 4, three or more markers (three markers 62-1 to 62-3 in FIG. 4) are attached to the receiver 22, a camera 61 takes an image of these markers 62-1 to 62-3, and the control device 12 computes the 3D position (coordinates) and orientation (angle) of the receiver 22 in the coordinate system (Xc, Yc, and Zc) of the camera 61 based on the positions of the markers 62-1 to 62-3 in the image taken by the camera 61. If the camera 61 is positioned at a position known to the magnetic-field generator 21, the control device 12 converts the position/orientation of the receiver 22 in the coordinate system (Xc, Yc, and Zc) of the camera 61 to the position/orientation of the receiver 22 in the coordinate system (Xm, Ym, and Zm) of the magnetic-field generator 21. The converted value (measured value of the receiver 22) is used as the real-space value of the receiver 22.

Accordingly, in this case, the real-space-value input unit 36 (FIG. 2) is connected to the camera 61, so that a signal of the image taken by the camera 61 (image information including the markers 62-1 to 62-3) is input to the real-space-value input unit 36. Incidentally, the above-described process of computing the measured value of the receiver 22 (position/orientation of the receiver 22 in the coordinate system (Xm, Ym, and Zm) of the magnetic-field generator 21) based on the positions of the markers 62-1 to 62-3 in the image taken by the camera 61 may be executed by the CPU 31 (FIG. 2) or the real-space-value input unit 36. Alternatively, the camera 61 (or another information processor (not shown)) may compute a measured value of the receiver 22, so that the measured value may be input by the real-space-value input unit 36.

As described above, the real-space value of the receiver 22 is used for correcting an error (error peculiar to a magnetic method) caused by the ambient environment, the error included in the measured value of the receiver 22 measured by the magnetic measuring device 11. Therefore, a 3D-position/orientation measuring device for measuring the real-space value of the receiver 22 is not limited to the optical device shown in FIG. 4. That is, any type of device which can measure the 3D-position/orientation of the receiver 22 without being affected by the ambient environment may be used. Specifically, instead of the optical device using the camera 61 and the markers 62-1 to 62-3, an ultrasonic device using ultrasonic transmitter/receiver or a mechanical device using a robot arm may be used. Further, these devices may be used in combination.

As described above, the 3D-position/orientation measuring devices of optical, ultrasonic, and mechanical methods have problems of poor operationality and narrow measurement range, while they have advantages in that they are not affected by the ambient environment. Therefore, these types of 3D-position/orientation measuring devices can be used for measuring the accurate position/orientation of the receiver 22, and a measured value of the receiver 22 measured by the 3D-position/orientation measuring devices of these methods can be used as the actual position/orientation (real-space value) of the receiver 22 in the real space.

Accordingly, the user need not measure the position/orientation of an object (for example, the receiver 22 in FIG. 4) in a real space by using a ruler or the like. Instead, the user can allow the control device 12 to obtain the measured value and the real-space value of an object almost at the same time, by operating a 3D-position/orientation measuring device which is affected by the ambient environment (for example, the magnetic measuring device 11 in FIG. 4) and a 3D-position/orientation measuring device which is not affected by the ambient environment (for example, the optical 3D-position/orientation measuring device shown in FIG. 4, including the camera 61 and the markers 62-1 to 62-3) at the same time. In this way, the operation performed by the user can be advantageously simplified.

Referring back to FIG. 2, when the CPU 31 corrects the measured value of the receiver 22 (FIG. 1), which has been input by the measured-value input unit 35, and outputs the corrected value in accordance with the flowchart shown in FIG. 6 (or FIG. 12) described later, the 3D-position/orientation output unit 37 obtains the corrected value and outputs the value as the actual 3D-position/orientation of the receiver 22.

A display 38 and a drive 39 are connected to the bus 34 as required. A removable recording medium 41, such as a magnetic disk, an optical disk, a magneto-optical disk, or a semiconductor memory, is loaded into a drive 39 as required, and a computer program read from the recording medium is installed into the storage unit 33 as required.

Figure 5:
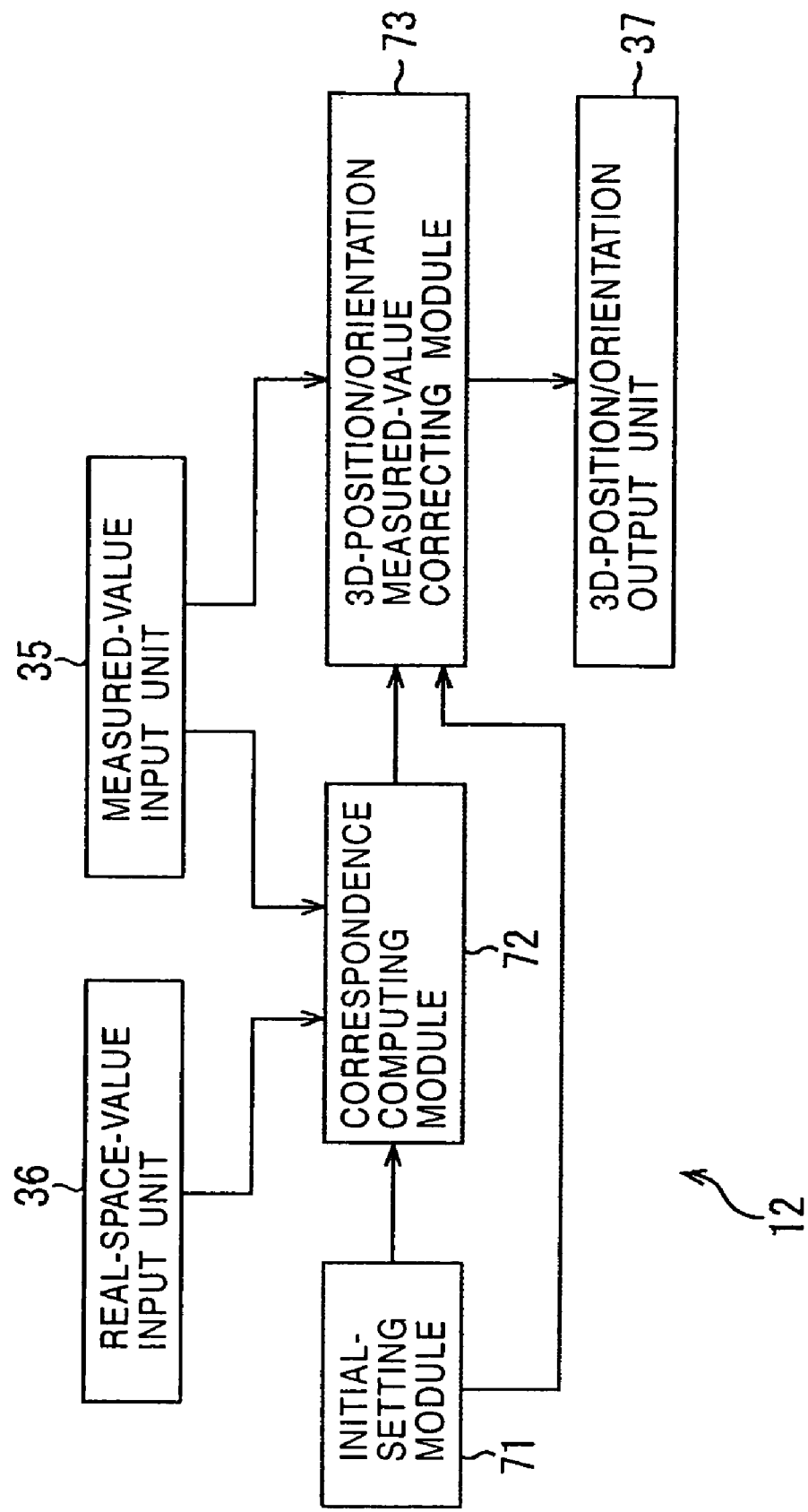
FIG. 5 is a block diagram showing an example of the software structure of the control device shown in FIG. 3.

FIG. 5 shows an example of the structure of a software program for realizing a function of correcting an error, resulting from the ambient environment, included in a measured value output from the magnetic measuring device 11 (FIG. 1), among the functions of the control device 12 (FIG. 2).

The software program shown in FIG. 5 includes a plurality of modules: an initial-setting module 71, a correspondence computing module 72, and a 3D-position/orientation measured-value correcting module 73. Each of the modules has an independent algorithm, and executes an individual operation in accordance with the algorithm. That is, each module is read out by the CPU 31 (FIG. 2) as required and is executed.

The initial-setting module 71 performs various initial settings required for the processes of the correspondence computing module 72 and the 3D-position/orientation measured-value correcting module 73. The correspondence computing module 72 computes the correspondence between a measurement space and a real space based on the measured value of the receiver 22 (FIG. 1), which has been output from the magnetic measuring device 11 (FIG. 1) and input through the measured-value input unit 35, and on the real-space value of the receiver 22, which corresponds to the measured value and which has been input through the real-space-value input unit 36 (in the example shown in FIG. 4, the measured value of the receiver 22 measured based on the image information of the markers 62-1 to 62-3 taken by the camera 61). Then, the correspondence computing module 72 supplies the correspondence to the 3D-position/orientation measured-value correcting module 73.

The 3D-position/orientation measured-value correcting module 73 corrects (cancels) an error of the measured value of the receiver 22 input through the measured-value input unit 35, based on the correspondence between the measurement space and the real space supplied from the correspondence computing module 72, the error resulting from the ambient environment of the magnetic measuring device 11. Then, the 3D-position/orientation measured-value correcting module 73 supplies the corrected value to the 3D-position/orientation output unit 37.

Next, an example of the operation of the control device 12 (FIG. 5) will be described with reference to the flowchart shown in FIG. 6. In this example, the 3D-position/orientation measuring and correcting system 1 is configured in a manner shown in FIG. 7. That is, in FIG. 7, the 3D-position/orientation measuring and correcting system 1 is adopted in a case where a virtual object 82 in a virtual space displayed in the display 38 is controlled by the magnetic measuring device 11. In this case, a user operates the receiver 22 three-dimensionally on a working plane 81, so as to operate the virtual object 82 in synchronization with the movement of the receiver 22.

However, if distortion occurs in a magnetic field due to the ambient environment and an error of the measured value occurs, the movement of the receiver 22 and the movement of the virtual object 82 do not synchronize to each other. Therefore, as described above, the control device 12 corrects the error of the measured value of the receiver 22 measured by the magnetic measuring device 11, so that the measured value of the receiver 22 is converted to a value corresponding to the actual position/orientation of the receiver 22. Such a process is performed by the control device 12 in accordance with the flowchart shown in FIG. 6.

In step S1, the initial-setting module 71 performs initial setting of various setting values which will be required in steps S2 and S3, which will be described later. As described above, in order to compute the correspondence between the measurement space and the real space (step S2, described later), a measured value indicating the position of the receiver 22 in the measurement space (value measured by the magnetic measuring device 11) and a real-space value which corresponds to the measured value and which indicates the actual position of the receiver 22 in the real space are required. In this example, a measured value of the receiver 22 measured by the optical 3D-position/orientation measuring device, including the camera 61 and the markers 62-1 to 62-3 attached to the receiver 22 (FIG. 7), is used as the real-space value.

Figure 7:
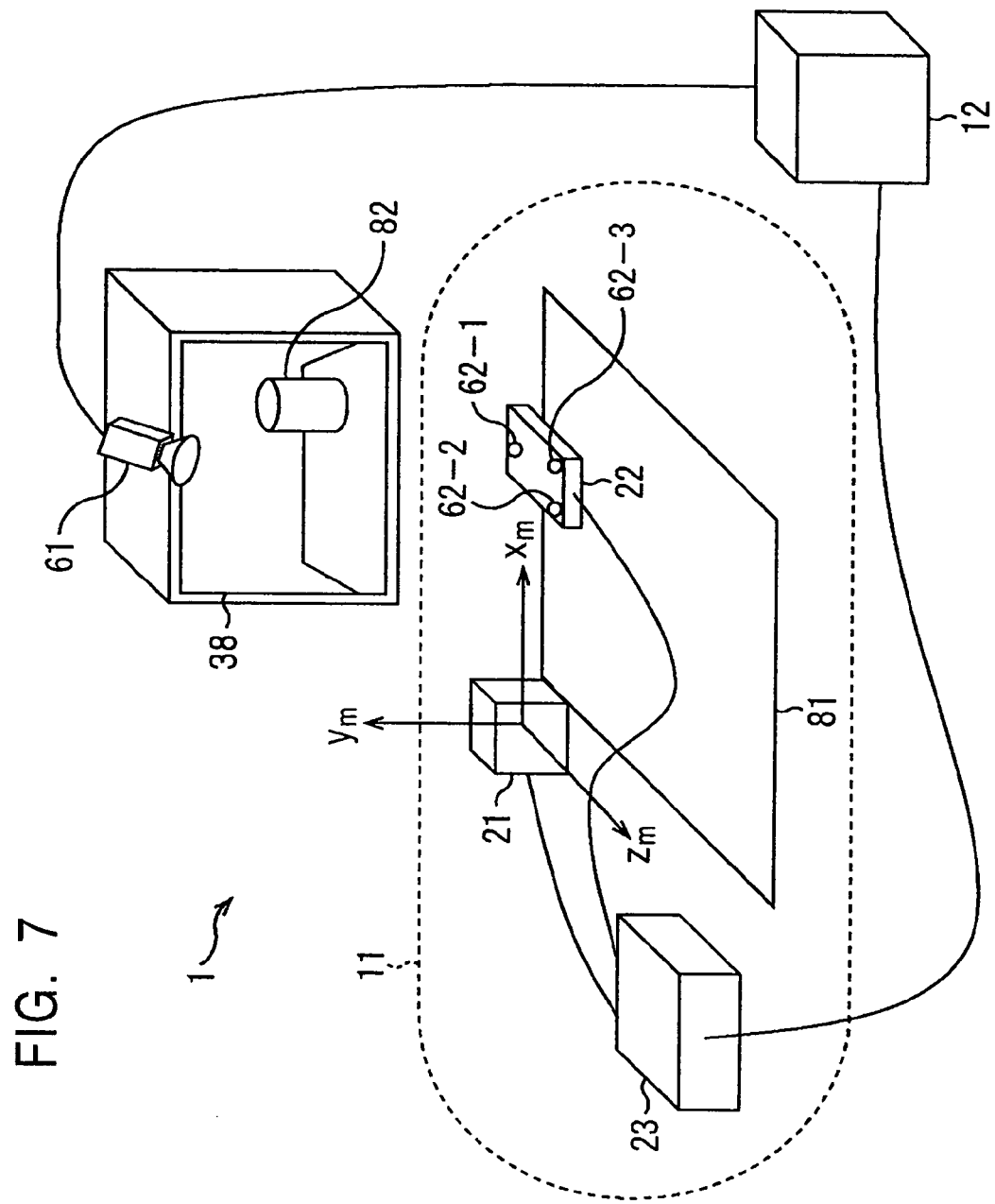
FIG. 7 shows an example of a specific configuration of the 3D-position/orientation measuring and correcting system shown in FIG. 1.

Specifically, in the example shown in FIG. 7, the camera 61, which is placed at a position known to the magnetic-field generator 21, takes an image of the working plane 81, and the control device 12 measures the position and orientation of the receiver 22 based on the positions of the markers 62-1 to 62-3 in the image, so that the measured value is used as the real-space value of the receiver 22.

That is, when the receiver 22 is positioned on the working plane 81, the 3D-position/orientation thereof can be measured by using the camera 61. In this example, the measured value is regarded as a real-space value (step S23 in FIG. 8, described later).

The vertical direction to the working plane 81 (Ym direction in FIG. 7) substantially corresponds to the shooting direction of the camera 61. The shooting range becomes narrow as the height increases. In that case, the range which can be measured by the camera 61 also becomes narrow, and the position above the camera 61 cannot be measured. Accordingly, in the vertical direction to the working plane 81, a known position (in this example, the position of the camera 61) is measured as a real-space value (step S25 in FIG. 8, described later).

Details of the method for computing the measured value using the optical 3D-position/orientation measuring device have been described above with reference to FIG. 4. However, in order to compute the measured value, the position/orientation of the receiver 22 in the coordinate system (Xc, Yc, and Zc) of the camera 61 must be converted to the position/orientation of the receiver 22 in the coordinate system (Xm, Ym, and Zm) of the magnetic-field generator 21 (coordinate conversion).

The direction and position (known direction and position) of the camera 61 in the coordinate system (Xm, Ym, and Zm) of the magnetic-field generator 21, which are necessary for the coordinate conversion, are set as an initial-setting value by the initial-setting module 71 in step S1.

Also, other various values such as intervals between discretely-represented measured values and real-space values and their approximate values; a reference value (number and ratio of data to be selected) used for selecting a measured value and a real-space value required for computing correspondence (step S26 in FIG. 8, described later); and time interval of measurement (scanning time, etc.) are set as initial-setting values by the initial-setting module 71 in step S1.

After initial setting is performed by the initial-setting module 71 in step S1, the correspondence computing module 72 computes the correspondence between the measurement space and the real space ins step S2, as described above.

Hereinafter, a process performed in step S2 is referred to as "a process of computing correspondence between measurement space and real space". Details of this process are shown in the flowchart in FIG. 8. Now, "the process of computing correspondence between measurement space and real space" will be described with reference to the flowchart in FIG. 8.

Figure 9:
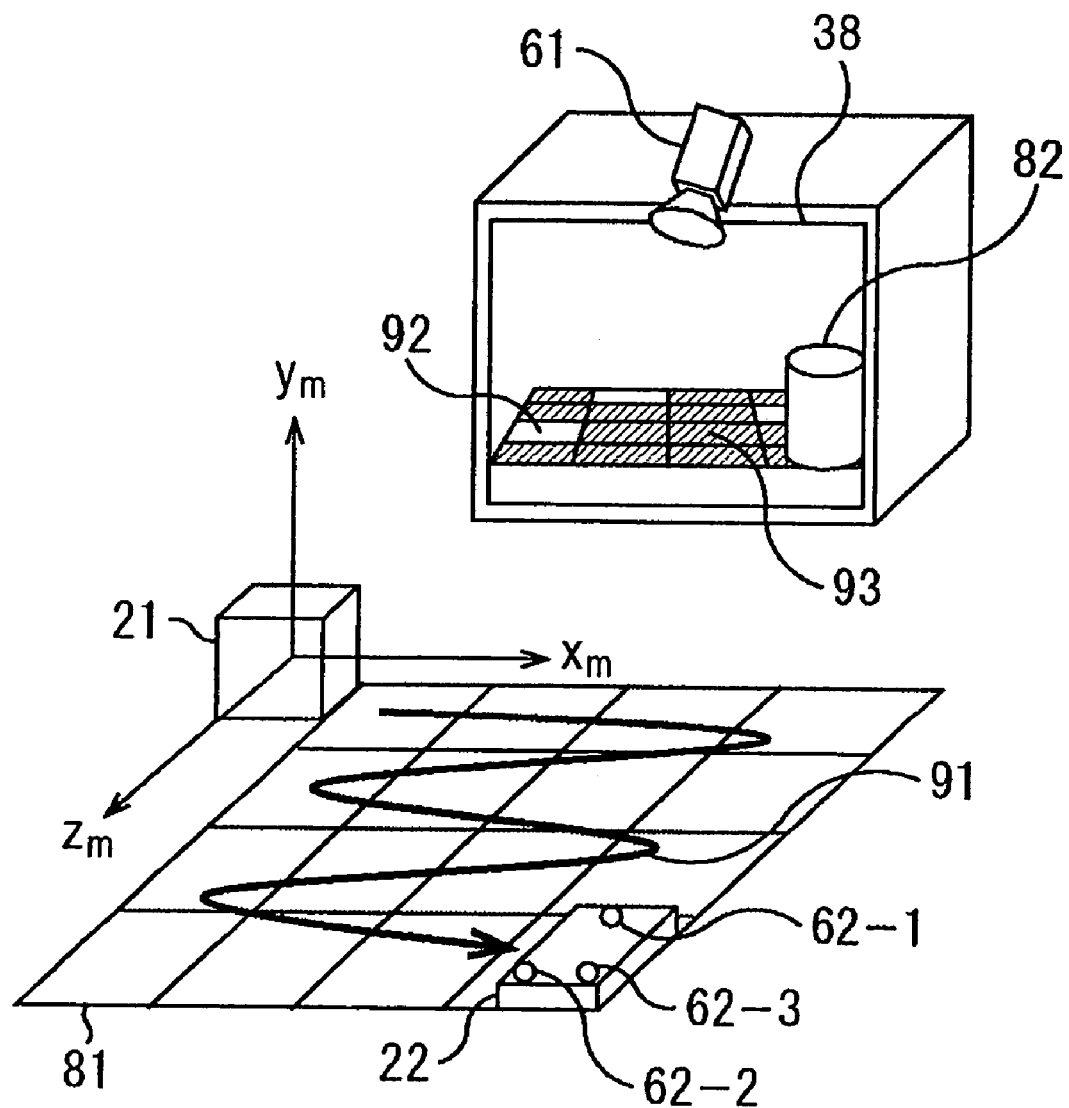
FIG. 9 illustrates an example of a method for obtaining a measured value and a real-space value in the 3D-position/orientation measuring and correcting system shown in FIG. 7.

First, in step S21, the correspondence computing module 72 determines whether or not obtaining data on the working plane 81 has been completed. Data used for computing the correspondence between the measurement space and the real space is preferably data of many measured values and real-space values which are evenly distributed. Therefore, in this example, the working plane 81 is divided into cells to form a lattice pattern as shown in FIG. 9, and the correspondence computing module 72 obtains data from each cell so as to obtain evenly distributed data. When a user wants to obtain a larger amount of data, the size of each cell in the lattice pattern should be reduced.

Figure 8:
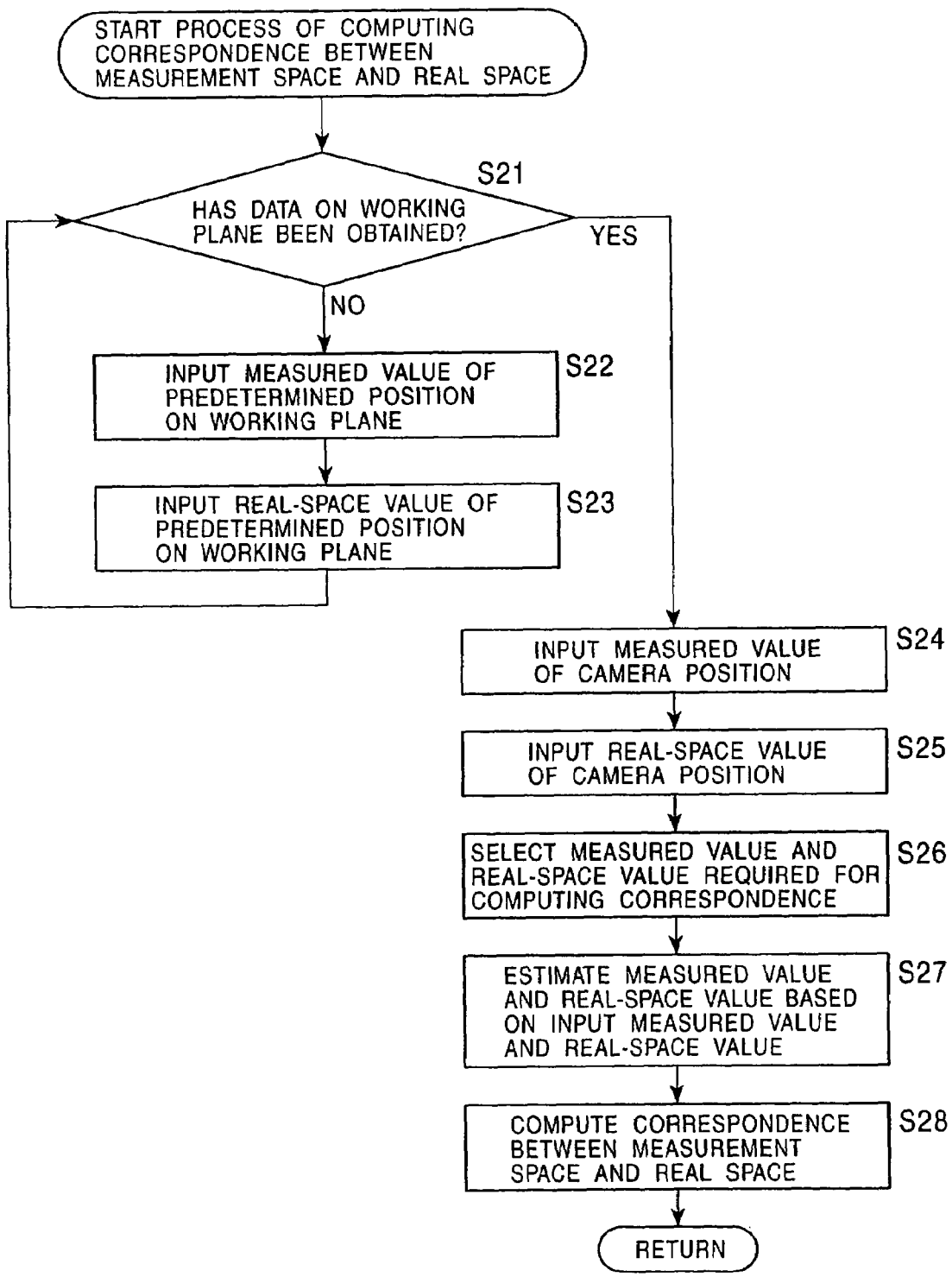
FIG. 8 is a flowchart illustrating a process of computing correspondence between measurement space and real space in the flowchart shown in FIG. 6.

Accordingly, in this example, the correspondence computing module 72 checks whether or not the data corresponding to every cell required for computing the correspondence between the measurement space and the real space has been obtained, so as to determine whether or not obtaining data on the working plane 81 has been completed in step S21 in FIG. 8.

Incidentally, a determination condition in step S21 is not limited to the above-described example. Alternatively, it may be determined that obtaining the data on the working plane 81 has been completed when a user notifies of completion of data obtaining.

In step S21, when it is determined that obtaining the data on the working plane 81 has not been completed, the correspondence computing module 72 inputs a measured value at a predetermined position on the working plane 81 (the position corresponding to a predetermined cell in the lattice on the working plane 81 in FIG. 9) through the measured-value input unit 35 in step S22. That is, the measured-value input unit 35 inputs a measured value of the receiver 22 positioned at a predetermined cell on the working plane 81 in FIG. 9 measured by the magnetic measuring device 11, and supplies the measured value to the correspondence computing module 72.

Then, in step S23, the correspondence computing module 72 inputs a real-space value at the predetermined position on the working plane 81 (the position corresponding to the measured value input in step S22) through the real-space-value input unit 36. That is, as described above, the real-space-value input unit 36 inputs image information of the markers 62-1 to 62-3 taken by the camera 61, computes a measured value of the receiver 22 positioned at a cell measured by the magnetic measuring device 11 among the cells in the lattice on the working plane 81 in FIG. 9 based on the input image information, and supplies the measured value to the correspondence computing module 72 as the real-space value of the receiver 22 (real-space value at the predetermined position on the working plane 81).

As described above, the process of computing the measured value of the receiver 22 (value used as the real-space value) based on the image information of the markers 62-1 to 62-3 taken by the camera 61 is performed by the measured-value input unit 35. Alternatively, the process may be performed by the correspondence computing module 72 (CPU 31 in FIG. 2) or by the camera 61.

Data inputting in steps S22 and S23 can be performed at the same time by clear instructions of a user, that is, by pressing a button (not shown) attached to the receiver 22. That is, when the button is pressed, the magnetic measuring device 11 measures the position of the receiver 22 and supplies the measured value to the correspondence computing module 72 through the measured-value input unit 35. At the same time, the camera 61 takes an image of the working plane 81 including the markers 62-1 to 62-3 (receiver 22) at the time when the button is pressed, and supplies an image signal (shooting information) to the real-space-value input unit 36. The real-space-value input unit 36 computes a measured value of the receiver 22 based on the supplied image information and supplies the measured value to the correspondence computing module 72 as the real-space value of the receiver 22.

In this case, however, the user has to press the button every time he/she obtains data, and the user's operation becomes complicated as the amount of data to be obtained increases (as the number of cells of the lattice increases). In order to simplify the user's operation, in this example, data inputting in steps S22 and S23 is automatically performed when the receiver 22 enters a data-unobtained area (cell). Herein, "automatically" means that the control device 12 performs a process by its own determination without through a user's manual operation (for example, operation of pressing button). Since data can be automatically obtained, the user can obtain the data only by dragging on the working plane 81 so as to move the receiver 22. That is, the user's operation can be simplified advantageously.

Specifically, as shown in FIG. 9, when the user drags the receiver 22 along a trail 91 on the working plane 81, steps S22 and S23 (FIG. 8) are repeatedly performed, so that the data (measured value and real-space value of each cell on the working plane 81) is automatically obtained.

Also, as shown in FIG. 9, when the correspondence computing module 72 (CPU 31 in FIG. 2) displays data-unobtained areas 92 and data-obtained areas 93 on the display 38, the user can visually determine data-unobtained areas. Accordingly, the user can easily move the receiver 22 to a cell (area) corresponding to the data-unobtained area 92.

In order to notify the user whether or not information of data-unobtained areas 92 and data-obtained areas 93, that is, a measured value and real-space value of each cell on the working plane 81 required for computing the correspondence between the measurement space and the real space (data which must be obtained in steps S22 and S23 (FIG. 8)), have been input to the correspondence computing module 72, voice information for instructing a moved place and three-dimensionally represented sound-field information may be used as well as image information.

Referring back to FIG. 8, when a measured value and a real-space value of each cell on the working plane 81, which are necessary for computing the correspondence between the measurement space and the real space, are input, the correspondence computing module 72 determines that obtaining data on the working plane 81 has been completed in step S21. Then, in step S24, the measured value of the position of the camera 61 is input through the measured-value input unit 35, and the real-space value of the position of the camera 61 is input through the real-space-value input unit 36 in step S25.

That is, the user allows the data on the working plane 81 to be input to the correspondence computing module 72, moves the receiver 22 to the position of the camera 61, and presses a button (not shown) attached to the receiver 22, so that the measured value of the position of the camera 61 (measured value of the receiver 22 measured by the magnetic measuring device 11) is input to the correspondence computing module 72 (step S24 is performed).

When the receiver 22 is positioned at the camera 61, it is difficult for the camera to take an image of the markers 62-1 to 62-3. In this case, the correspondence computing module 72 inputs the position of the camera 61 set by the initial-setting module 71 in step S1 (FIG. 6) through the initial-setting module 71 as a real-space value of the camera 61.

Alternatively, if a receiver (not shown) different from the receiver 22 is attached to the camera 61, steps S24 and S25 are automatically performed. In that case, entire data (measured value and real-space value) required for computing the correspondence between the measurement space and the real space can be obtained when the user drags the receiver 22 on the working plane 81.

The order of a process for obtaining the data on the working plane 81 in steps S21 to S23 and a process for obtaining the data of the position of the camera 61 in steps S24 and S25 is not specified. That is, the process for obtaining the data of the position of the camera 61 may be performed first.

Next, in step S26, the correspondence computing module 72 selects a measured value and a real-space value required for computing the correspondence between the measurement space and the real space. When the amount of data is large, time for computing the correspondence (time required for performing step S28) becomes longer. Therefore, step S26 is performed for reducing the amount of data so as to shorten the computing time. Further, step S26 is performed for extracting reliable data so as to improve the accuracy of computing the correspondence.

Specifically, when a plurality of real-space values which are spatially approximate to each other exist among the input real-space values, the correspondence computing module 72 regards these real-space values as redundant data, and omits data corresponding to some of the redundant real-space values (real-space values and corresponding measured values). Alternatively, the correspondence computing module 72 may record the time when measured values and real-space values are input, so as to omit temporally old data (unreliable measured values and real-space values).

Step S26 may be omitted when the time for computing the correspondence is not a problem and when entire data (all measured values and real-space values obtained in step S22, S23, S24, or S25) is reliable.

Then, in step S27, the correspondence computing module 72 estimates another measured value and real-space value based on the measured value and real-space value input in step S22, S23, S24, or S25 (or measured value and real-space value selected in step S26).

Figure 10:
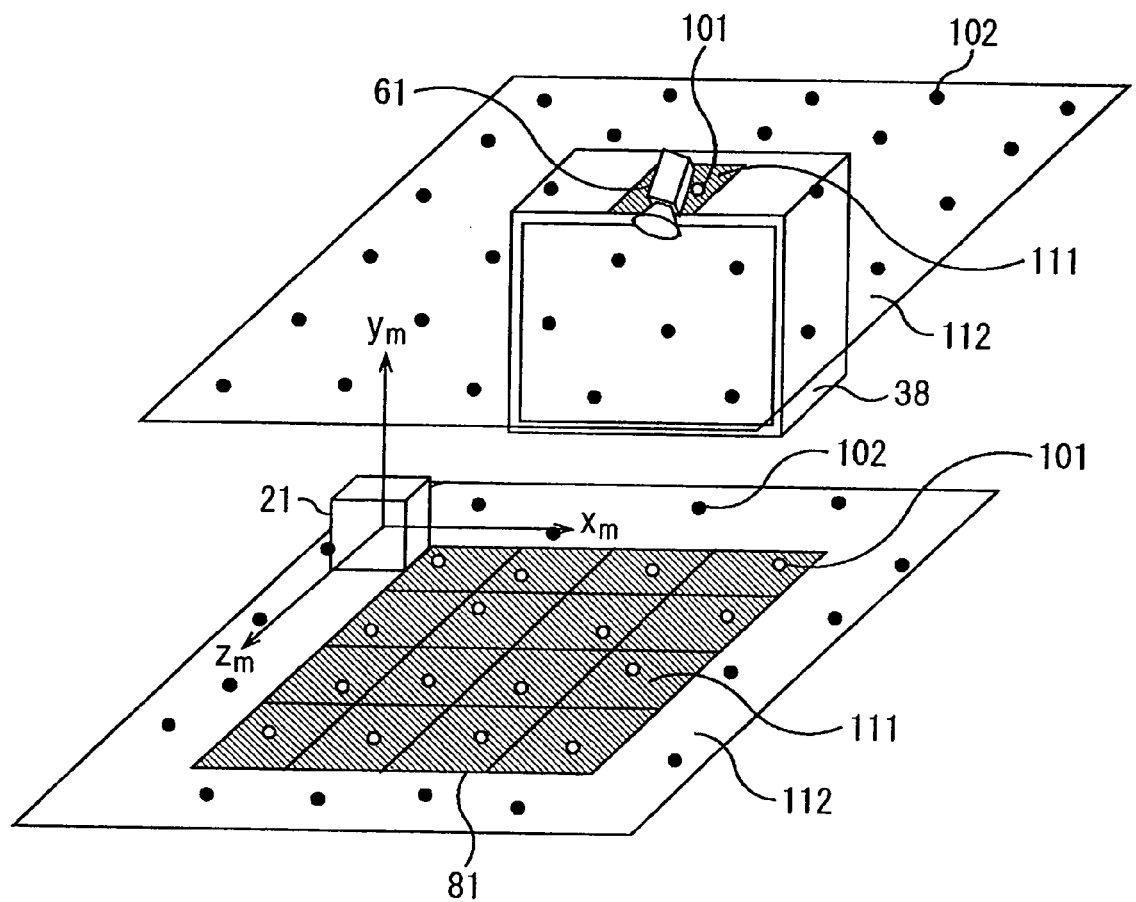
FIG. 10 illustrates relationship between obtained measured values and estimated measured values which are estimated based on the obtained measured values.

Specifically, as shown in FIG. 10, a measured value (measurement data represented by a white circle) 101 is obtained from each cell on the working plane 81 in step S22. Also, a measured value (measurement data represented by a white circle) 101 of the position of the camera 61 is obtained in step S24.

In this case, the correspondence computing module 72 computes estimated measured values (estimated data represented by black circles) 102 based on the measured values 101. More specifically, the correspondence computing module 72 moves the measured value 101 of the position of the camera 61 in parallel so as to compute estimated measured values 102 around the camera 61. Also, the correspondence computing module 72 extrapolates the measured value 101 of the position of each cell on the working plane 81 so as to compute estimated measured values 102 around the working plane 81.

Although not shown in the drawings, estimated real-space values corresponding to the estimated measured values 102 are computed based on the real-space value of the position of each cell on the working plane 81 obtained in step S23 and the real-space value of the position of the camera 61 obtained in step S25.

That is, when the correspondence between the measurement space and the real space is computed by using only the measured value 101 and the real-space value corresponding to the measured value 101, the correspondence in a measurement data area 111 (diagonally shaded area 111) can be obtained. However, the correspondence outside the measurement data area 111 cannot be obtained. In particular, when measured values near the boundaries of the measurement data area 111 are corrected based on such correspondence, the corrected values tend to be discrete.

In order to overcome this problem, in step S27, the correspondence computing module 72 estimates data (estimated measured value 102 and real-space value corresponding to the estimated measured value 102) based on the measured value 101 and the real-space value corresponding to the measured value 101. Accordingly, the correspondence between the measurement space and the real space in a wide range including an estimated data area 112 can be computed. Also, when the measured values near the boundaries of the measurement data area 111 are corrected based on the correspondence computed in such a manner, the corrected values may be smoothly sequential.

Figure 6:
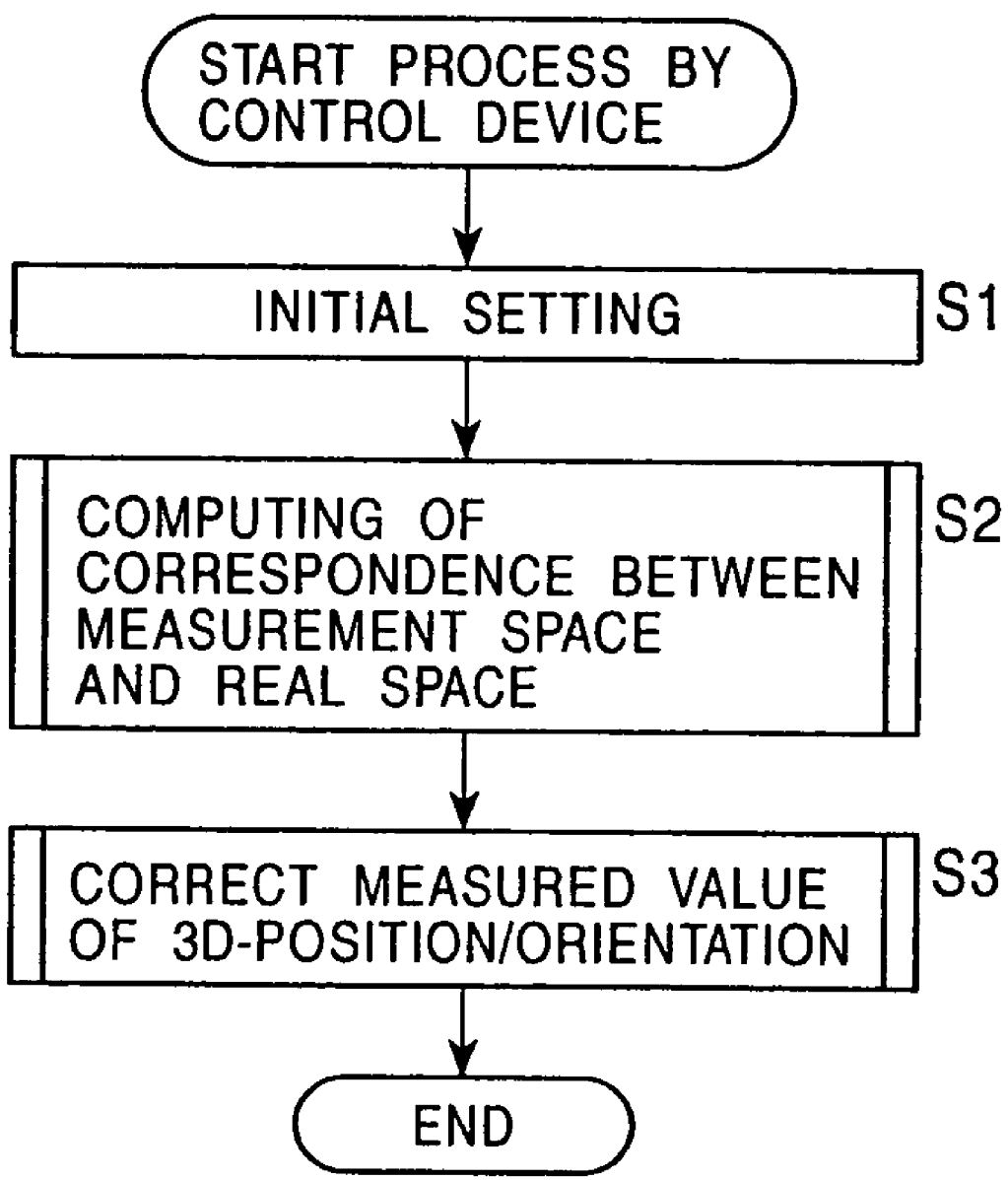
FIG. 6 is a flowchart illustrating an example of a process performed by the control device shown in FIG. 3.

The number of estimated measured values 102 and estimated real-space values corresponding to the estimated measured values 102, which are estimated in step S27, and spatial intervals therebetween (mutual distance) are not specified, but they are determined based on the value which is initially set in step S1 (FIG. 6). That is, the user allows the initial-setting module 71 to set a desired value, so that the user allows the correspondence computing module 72 to compute the correspondence between the measurement space and the real space in the estimated data area 112, where arbitrary numbers of estimated data (estimated measured values and estimated real-space values) are evenly distributed at arbitrary intervals.

Preferably, the number of data pieces in the estimated data area 112 including the working plane 81 (total number of measured values 101 and estimated measured values 102) is almost the same as the number of data pieces in the estimated data area 112 including the position of the camera 61 (total number of measured values 101 and estimated measured values 102). The reason is as follows. In the embodiment, the correspondence between a measured value and a real-space value is computed based on the two estimated data areas 112 and the measured value is corrected based on the computed correspondence. However, if the number of data pieces in one of the two estimated data area 112 is significantly different from the number of data pieces in the other estimated data area 112, the corrected measured value approaches the estimated data area 112 including larger number of data pieces. That is, when the number of data pieces in one of the two estimated data area 112 is significantly different from the number of data pieces in the other estimated data area 112, a measured value is not accurately corrected in many cases.

When measured values 101 and real-space values corresponding to the measured values 101 can be obtained in a sufficiently wide range, step S27 can be omitted. In that case, however, user's operation becomes complicated.

The order of steps S26 and S27 is not specified. That is, step S27 may be performed first, or steps S26 and S27 may be performed at the same time. For example, the correspondence computing module 72 may compute the average of a plurality of data pieces in which real-space values are spatially or temporally approximate to each other, so that the obtained average value is regarded as estimated data and that original data is deleted.

In this way, data used for computing the correspondence between the measurement space and the real space (in the example shown in FIG. 10, measured value 101, estimated measured value 102, real-space value corresponding to the measured value 101, and estimated real-space value corresponding to the estimated measured value 102) is determined in steps S26 and S27. Then, the correspondence computing module 72 computes the correspondence between the measurement space and the real space based on the determined data.

Specifically, in this example, correspondence (mapping for converting measurement space to real space) represented by the following equation (1) is computed.

$$\begin{bmatrix} x' \\ y' \\ z' \\ 1' \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix} \begin{bmatrix} x \\ y \\ z \\ 1 \end{bmatrix} \quad (1)$$

In equation (1), (x, y, z) represent measured values (including an estimated measured value), and (x', y', z') represent real-space values (including an estimated real-space value). Also, $m_{11}$ to $m_{44}$ represent components of conversion matrix for converting a measurement space to a real space.

That is, the correspondence computing module 72 computes the values of $m_{11}$ to $m_{44}$ based on relationships between a plurality of measured values (x, y, z) and real-space values (x', y', z') by using the method of least squares or the like, so as to compute the correspondence between the measurement space and the real space (conversion matrix formed by $m_{11}$ to $m_{44}$).

The correspondence computed in step S28 and its computing method is not limited to the above-described example. Alternatively, the correspondence computing module 72 may compute mapping from measurement space to real space by nonlinear conversion, such as neural network in which the function of human's brain is imitated.

In this way, the correspondence computing module 72 can compute the correspondence between the measurement space and the real space in a wide range based on a small amount of data in accordance with the flowchart shown in FIG. 8. That is, the correspondence between the measurement space and the real space in a wide range can be computed by user's simple operation.

Referring back to FIG. 6, the correspondence between the measurement space and the real space, computed by the correspondence computing module 72 in the process of computing correspondence between measurement space and real space in step S2, is supplied to the 3D-position/orientation measured-value correcting module 73 (hereinafter referred to as correcting module 73). Then, in step S3, the correcting module 73 corrects an error of the measured value input through the measured-value input unit 35 (measured value of the receiver 22 measured by the magnetic measuring device 11) based on the supplied correspondence between the measurement space and the real space, the error resulting from the ambient environment of the magnetic measuring device 11.

Hereinafter, a process performed in step S3 will be referred to as a process of correcting 3D-position/orientation measured value. This process is shown in the flowchart in FIG. 11. Now, the process of correcting 3D-position/orientation measured value will be described in detail with reference to the flowchart shown in FIG. 11.

First, in step S41, the correcting module 73 determines whether or not the end of the process is instructed. The condition of determination in step S41 (condition for determining the end of the process has been instructed) is not specified. The condition may be user's input, a predetermined rule in application software (for example, game over in a game), or restrictions on hardware or software, such as memory-full.

In step S41, when it is determined that the end of process is instructed, the process is returned. On the other hand, when it is determined that the end of process has not been instructed in step S41, the correcting module 73 inputs the measured value of the receiver 22 through the measured-value input unit 35. That is, the measured-value input unit 35 inputs the measured value of the receiver 22 positioned at a predetermined position measured by the magnetic measuring device 11, so as to supply the measured value to the correcting module 73.

Then, in step S43, the correcting module 73 corrects the measured value input in step S42 based on the correspondence between the measurement space and the real space computed by the correspondence computing module 72 in step S2 (FIG. 6), and then supplies the corrected value to the 3D-position/orientation output unit 37.

That is, in this example, the mapping from the measurement space to the real space (correspondence between the measurement space and the real space) represented by the above equation (1) is computed by the correspondence computing module 72 in step S2. Accordingly, the correcting module 73 computes a real-space value by substituting the measured value of the receiver 22 measured by the magnetic measuring device 11 into equation (1), and supplies the computed real-space value, which serves as a corrected value, to the 3D-position/orientation output unit 37. The 3D-position/orientation output unit 37 outputs the supplied corrected value as the actual position/orientation of the receiver 22 in the real space.

Then, the process returns to step S41, and the following steps are repeatedly performed. That is, every time a measured value is input, the measured value is corrected, until the end of the process is instructed.

Figure 11:
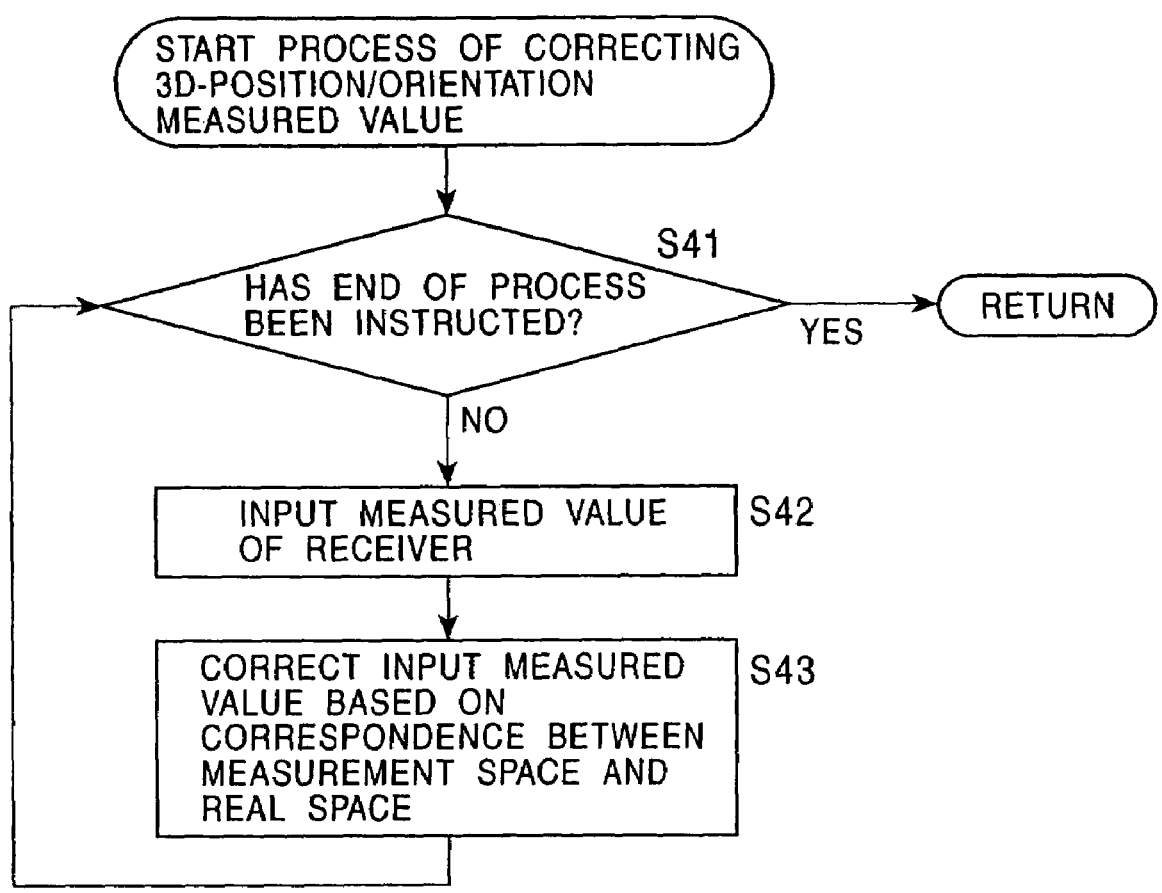
FIG. 11 is a flowchart illustrating a process of correcting 3D-position/orientation measured value in the flowchart shown in FIG. 6.

In this way, the 3D-position/orientaion measured-value correcting module 73 corrects the error of the measured value of the receiver 22 measured by the magnetic measuring device 11 based on the correspondence between the measurement space and the real space computed by the correspondence computing module 72 in accordance with the flowchart shown in FIG. 11, the error resulting from the ambient environment of the magnetic measuring device 11. Then, the correcting module 73 outputs the corrected value as the actual position/orientation of the receiver 22 in the real space.

An example of the operation of the control device 12 in the 3D-position/orientation measuring and correcting system 1, whose configuration is shown in FIG. 7, has been described above with reference to the flowchart shown in FIG. 6.

As described above, an error included in a measured value measured by the magnetic measuring device 11 often results from the ambient environment of the magnetic measuring device 11. Therefore, the error changes depending on the ambient environment. When the ambient environment changes (or is changed), the correspondence between the measurement space and the real space must be updated so as to perform adequate correction. In that case, the process of computing the correspondence between measurement space and real space in step S2 must be performed again in the flowchart shown in FIG. 6, and thus the user's operation becomes complicated.

Figure 12:
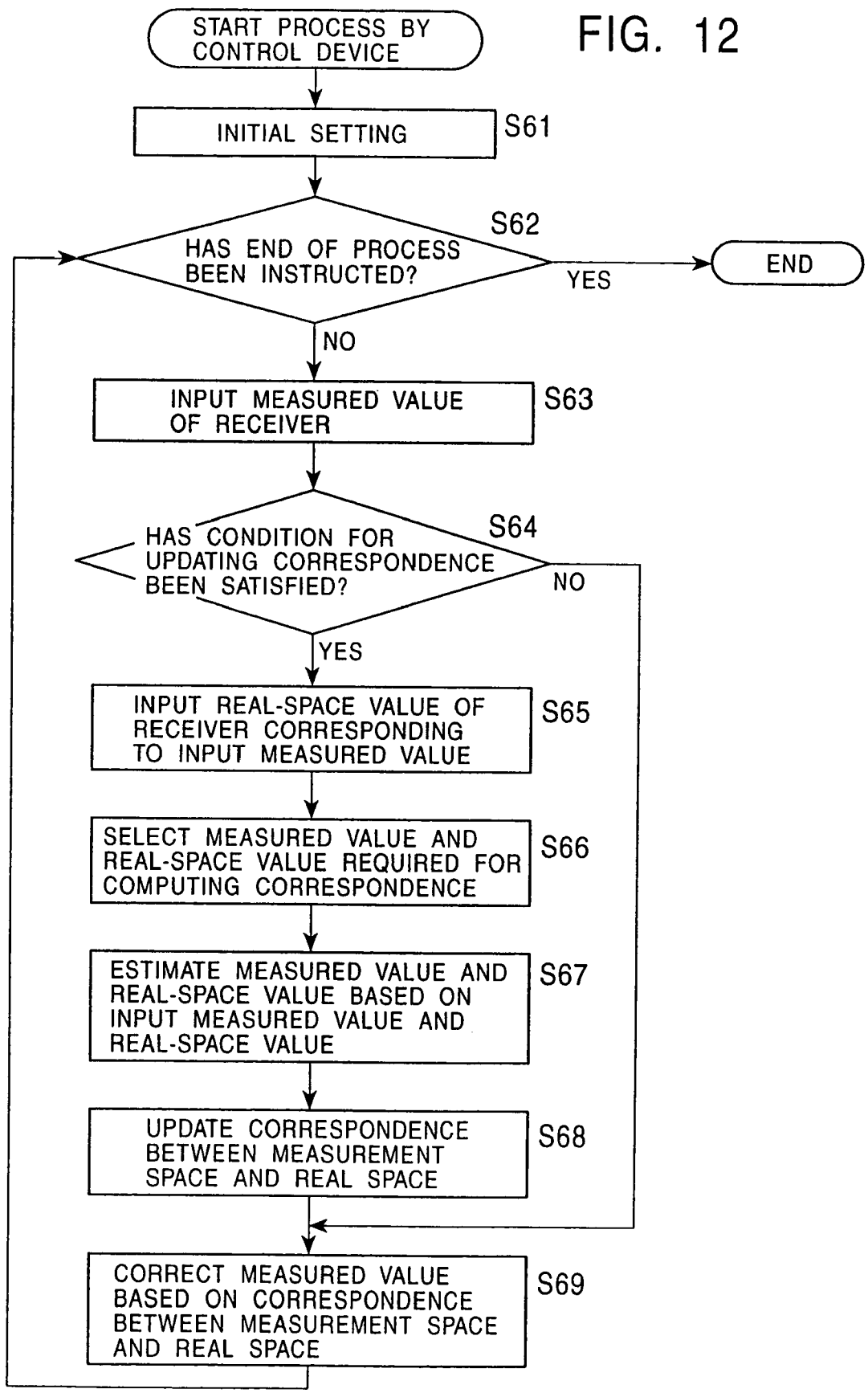
FIG. 12 is a flowchart illustrating another example of the process performed by the control device shown in FIG. 3.

In this case, the control device 12 shown in FIG. 5 can perform the process in accordance with the flowchart shown in FIG. 12, instead of the flowchart shown in FIG. 6. According to the flowchart shown in FIG. 12, a series of processes: a process of obtaining measured value and real-space value; a process of computing the correspondence between measurement space and real space; and a process of correcting the measured value, can be performed sequentially.

Specifically, in step S61, the initial-setting module 71 performs initial setting: initialization of the correspondence between the measurement space and the real space; and initialization of various parameters for updating the correspondence. More specifically, the initial-setting module 71 performs initialization of correspondence: divides the real space into cells so as to form a lattice pattern, sets dummy measured value and real-space value to each cell, allows the correspondence computing module 72 to compute the correspondence by using the dummy data, and sets the correspondence as the initial value. As the dummy measured value and real-space value, values which have been stored in the storage unit 33 (FIG. 2) as a file in advance, or values input by the user may be used.

Then, the correcting module 73 determines whether or not the end of process has been instructed in step S62. The condition of determination in step S62 (condition for determining that the end of process has been instructed) is not specified, and various conditions may be used as in step S41 (FIG. 11). When it is determined that the end of process has been instructed in step S62, the process is completed.

On the other hand, when it is determined that the end of process has not been instructed in step S62, the correcting module 73 inputs the measured value of the receiver 22 through the measured-value input unit 35. As will be described later, since correspondence may be computed (updated) by using the measured value, the measured value input to the correcting module 73 in step S63 is also input to the correspondence computing module 72. That is, the measured-value input unit 35 inputs the measured value of the receiver 22 positioned at a predetermined position measured by the magnetic measuring device 11 (FIG. 7), and supplies the measured value to the correspondence computing module 72 and the correcting module 73.

Then, in step S64, the correcting module 73 determines whether or not the condition for updating the correspondence has been satisfied. The condition for update in step S64 is not specified. For example, the condition may be inputting of measured value. In that case, the correspondence is updated every time a measured value is input in step S63, and thus the accuracy of correction of measured value can be improved. However, the amount and time of process by the control device 12 increases accordingly. Thus, when the amount and time of process by the control device 12 must be suppressed, lapse of predetermined time and input of predetermined amount of data may be set as conditions for update, so that the correspondence may be periodically updated. Alternatively, a user's clear instruction, such as pressing of a button, may be set as the condition for update, so that the correspondence is updated only when the user desires update.

Further, the condition for update in step S64, that is, the condition for update of correspondence between the measurement space and the real space performed by the correspondence computing module, may be set based on spatial position relationship between the real-space value input latest in step S65 (details will be described later) and a plurality of real-space values which have been input previously in step S65. Specifically, for example, when the real-space value input latest in step S65 is approximate to a previously input real-space value by a predetermined distance, it may be determined that the condition for updating the correspondence has been satisfied in step S64.

When it is determined that the condition for updating the correspondence has not been satisfied in step S64, the correcting module 73 corrects the measured value of the receiver 22 input in step S63 based on the correspondence between the measurement space and the real space which was used in the previous step S69, and outputs the corrected value to the 3D-position/orientation output unit 37. Then the process is returned to step S62 and the following steps are repeatedly performed. That is, every time a measured value is input, the measured value is corrected until the end of process is instructed.

On the other hand, when it is determined that the condition for updating the correspondence has been satisfied in step S64, the correcting module 73 transfers the right of performing the process to the correspondence computing module 72. Then, the correspondence computing module 72 performs steps 65 to 68 so as to update the correspondence between the measurement space and the real space.

That is, in step S65, the correspondence computing module 72 inputs a real-space value of the receiver 22 corresponding to the measured value input in step S63 through the real-space-value input unit 36. In other words, as described above, the real-space-value input unit 36 inputs image information of the markers 62-1 to 62-3 taken by the camera 61, computes the measured value of the receiver 22 based on the input image information, and supplies the computed measured value to the correspondence computing module 72 as the real-space value of the receiver 22.

Then, the correspondence computing module 72 selects a measured value and a real-space value required for computing the correspondence in step S66, and estimates another measured value and real-space value based on the input measured value and real-space value in step S67. That is, in steps S66 and S67, the correspondence computing module 72 performs the same processes as those in steps S26 and S27 in FIG. 8. Accordingly, the correspondence between the measurement space and the real space can be always computed in real time based on the latest data.

Then, in step S68, the correspondence computing module 72 computes (updates) the correspondence between the measurement space and the real space, as in step S28 in FIG. 8. Specifically, for example, the correspondence computing module 72 computes the correspondence (conversion matrix) represented by the above equation (1) by using the method of least squares or the like. Of course, the correspondence between the measurement space and the real space may be computed by using a neural network or the like, as described above.

Further, the correspondence computing module 72 may update only changed part by using the correspondence between the measurement space and the real space before update. Specifically, the correspondence computing module 72 sets the correspondence before update to the initial value of the method of least squares and neural network, so as to obtain the correspondence more quickly.

The correspondence computing module 72 supplies the correspondence between the measurement space and the real space which has been updated in step S68 to the correcting module 73, and also transfers the right of performing the process to the correcting module 73.

Then, in step S69, the correcting module 73 corrects the measured value of the receiver 22 input in step S63 based on the correspondence between the measurement space and the real space updated by the correspondence computing module 72 in step S68, and outputs the corrected value to the 3D-position/orientation output unit 37. Then, the process returns to step S62, so that the following steps are repeated.

In this way, the control device 12 sequentially performs the above-described series of processes: the process of obtaining a measured value and real-space value, the process of computing the correspondence between the measurement space and the real space, and the process of correcting the measured value, in accordance with the flowchart shown in FIG. 12. Accordingly, the measured value can be corrected in real time in compliance with the ambient environment.

As described above, the correspondence computing module 72 computes the correspondence between the measurement space and the real space based on a measured value and a real-space value. Generally, the measured value can be accurately corrected when a larger amount of information of the measured value and the real-space value can be available. Therefore, the control device 12 sequentially obtains the information and sequentially updates the correspondence, so as to gradually improve the accuracy of correction.

Thus, even if step S2 in FIG. 6 is omitted, that is, even if a process of obtaining many measured values and real-space values is not performed, measured values and real-space values can be automatically obtained and correspondence is sequentially updated based on the automatically obtained measured values and real-space values simply by user's operation of the 3D-position/orientation measuring and correcting system 1. Accordingly, accurate correction can be realized.

When the ambient environment of the magnetic measuring device 11 frequently changes so that the error of a measured value is affected (for example, when a user puts products made of iron or aluminum around the magnetic measuring device 11, or when the user moves the magnetic measuring device 11 (magnetic-field generator 21)), step S2 in FIG. 6, the process of computing correspondence between measurement space and real space, has to be performed every time the ambient environment changes.

On the other hand, in the flowchart shown in FIG. 12, data (measured values and real-space values) is sequentially obtained and also the correspondence between the measurement space and the real space is sequentially updated by using the latest data. Accordingly, latest correspondence can be always maintained. That is, the control device 12, which performs the process shown in the flowchart in FIG. 12, is maintained at a state for immediately correcting a measured value output from the magnetic measuring device 11 even when preprocessing such as step S2 in FIG. 6 is not performed.

As described above, in the embodiment, a spatial position of the receiver 22 is measured in a magnetic method by the magnetic 3D-position/orientation measuring device 11, and a measured value is output. Then, the control device 12 processes the measured value which indicates the position of the receiver 22 in the measurement space and which has been output from the magnetic 3D-position/orientation measuring device 11, and also processes a real-space value which corresponds to the measured value and which indicates the position of the receiver 22 in the real space (in the example shown in FIG. 7, a value measured by the optical 3D-position/orientation measuring device including the camera 61 and the markers 62-1 to 62-3). Then, correspondence between the measurement space and the real space is computed based on the input measured value and real-space value, so that an error of the input measured value is corrected based on the computed correspondence between the measurement space and the real space, the error resulting from the ambient environment of the magnetic 3D-position/orientation measuring device 11 (magnetic distortion peculiar to a magnetic method).

That is, in the embodiment, a value measured by a 3D-position/orientation measuring device (for example, the magnetic 3D-position/orientation measuring device 11) in which an error occurs due to the ambient environment can be adequately corrected based on the correspondence between the measurement space and the real space.

Also, in the embodiment, a measured value and a real-space value can be easily obtained by using the magnetic 3D-position/orientation measuring device in combination with a 3D-position/orientation measuring device which is not affected by the ambient environment (for example, the optical 3D-position/orientation measuring device including the camera 61 and the markers 62-1 to 62-3 shown in FIG. 7, or ultrasonic or mechanical 3D-position/orientation measuring device). Further, by estimating data based on input measured value and real-space value (by computing an estimated measured value 102 and an estimated real-space value corresponding to the estimated measured value 102 shown in FIG. 10), correspondence between the measurement space and the real space can be computed by using a smaller amount of data, and as a result, user's operation can be simplified. Further, by clearly presenting a data-unobtained area to the user (in the example shown in FIG. 10, by displaying the data-unobtained area 92 (and data-obtained area 93) in the display 38), user's operation can be supported.

When the above-described series of processes of the control device 12 is executed by software, a program constituting the software is installed through a network or a recording medium into a computer incorporated in dedicated hardware or into a multi-purpose personal computer which can execute various functions by installing various programs thereto.

The recording medium includes the removable recording medium (package medium) 41 shown in FIG. 2, which is distributed for providing a program to a user independently from a main body of a device and which contains a program, such as a magnetic disk (including a floppy disk), an optical disk (including a compact disk-read only memory (CD-ROM) and digital versatile disk (DVD)), a magneto-optical disk (including a mini-disk (MD)), or a semiconductor memory. Also, the recording medium includes the memory 32 containing a program (for example, read only memory (ROM)) and a hard disk included in the storage unit 33, which are incorporated into the main body of the device in advance.

Also, the form of the above-described initial-setting module 71, the correspondence computing module 72, and the 3D-position/orientation measured-value correcting module 73 is not limited, as long as each module has a corresponding function. That is, each module may be formed by hardware or the like. In this case, a manufacturer manufactures devices (hardware) corresponding to the initial-setting module 71, the correspondence computing module 72, and the 3D-position/orientation measured-value correcting module 73, and connects these devices in a manner shown in FIG. 5. Accordingly, the control device 12 to which the present invention is applied can be realized in a configuration different from that shown in FIG. 2.

Further, in this specification, steps describing the program recorded in a recording medium may be performed in time-series according to the described order, or may be performed in parallel or individually. In this specification, the system includes a plurality of devices and processing units.

As described above, according to the present invention, a system for measuring 3D-position/orientation of an object in the real world can be realized. In particular, a system having a user-friendly operation system, in which 3D-position/orientation of an object can be measured and an error of the measured value resulting from the ambient environment can be adequately corrected, can be realized.

Further, according to the present invention, 3D-position/orientation of an object in the real world can be measured. In particular, a system having a user-friendly operation system, in which 3D-position/orientation of an object can be measured and an error of the measured value resulting from the ambient environment can be adequately corrected, can be realized.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An information processing system including an information processor, the information processing system comprising:
   measured-value input means for inputting a measured value indicating a spatial position of an object, the measured value being measured by and output from a first 3D-position measuring device;
   real-space-value input means for inputting a real-space value which corresponds to the measured value input by the measured-value input means and which indicates the position of the object in a real space;
   correspondence computing means for computing correspondence between the measurement space and the real space based on the measured value input by the measured-value input means and the real-space value input by the real-space-value input means;
   correcting means for correcting an error of the measured value input by the measured-value input means based on the correspondence between the measurement space and the real space computed by the correspondence computing means, the error resulting from the ambient environment of the first 3D-position measuring device; and
   a second 3D-position measuring device includes an ultrasonic 3D-position measuring device, which can measure the position of the object without being affected by the ambient environment, measures the position of the object existing at the same position as that measured by the first 3D-position measuring device so as to output the measured value, the real-space-value input means inputs the measured value output from the second 3D-position measuring device as the real-space value.

2. An information system including an information processor, the information system comprising:
   measured-value input means for inputting a measured value indicating a spatial position of an object, the measured value being measured by and output from a first 3D-position measuring device;
   real-space-value input means for inputting a real-space value which corresponds to the measured value input by the measured-value input means and which indicates the position of the object in a real space;
   correspondence computing means for computing correspondence between the measurement space and the real space based on the measured value input by the measured-value input means and the real-space value input by the real-space-value input means;
   correcting means for correcting an error of the measured value input by the measured-value input means based on the correspondence between the measurement space and the real space computed by the correspondence computing means, the error resulting from the ambient environment of the first 3D-position measuring device, wherein
   the correspondence computing means estimates a measured value which has not been input by the measured-value input means and a real-space value which has not been input by the real-space-value input means based on at least one measured value input by the measured-value input means and at least one real-space value input by the real-space-value input means, and computes the correspondence between the measurement space including the input measured value and the estimated measured value and the real space including the input real-space value and the estimated real-space value.

* * * * *